United States Patent [19]

Walsh

[11] Patent Number: 4,584,113

[45] Date of Patent: Apr. 22, 1986

[54] SULFURIZED COMPOSITIONS AND LUBRICANTS CONTAINING THEM

[75] Inventor: Reed H. Walsh, Mentor, Ohio

[73] Assignee: The Lubrizol Corporation, Wickliffe, Ohio

[21] Appl. No.: 664,465

[22] Filed: Oct. 25, 1984

[51] Int. Cl.$^4$ .................. C07C 161/00; C10M 1/38
[52] U.S. Cl. ...................... 252/45; 252/48.2; 252/48.6; 568/18; 568/75
[58] Field of Search .............. 252/45, 48.2, 48.6, 252/406; 568/18, 75

[56] References Cited

U.S. PATENT DOCUMENTS

| | | | |
|---|---|---|---|
| 2,012,446 | 8/1935 | Edwards et al. | 252/48.6 |
| 2,246,282 | 6/1941 | Zimmer et al. | 252/45 |
| 3,221,056 | 11/1965 | Loutham | 260/583 |
| 3,419,614 | 12/1968 | Doss | 260/583 |
| 3,953,347 | 4/1976 | Habiby | 252/48.6 |
| 4,119,549 | 10/1978 | Davis | 252/45 |
| 4,191,659 | 3/1980 | Davis | 252/45 |

Primary Examiner—W. J. Shine
Attorney, Agent, or Firm—Walter C. Danison, Jr.; Denis A. Polyn; Forrest L. Collins

[57] ABSTRACT

A sulfurized composition prepared by sulfurizing a mixture of at least one terpene and at least one other olefinic compound is described. More particularly, sulfurized compositions prepared by sulfurizing a mixture of pine oil and at least one other olefinic compound are described. Such sulfurized compositions are useful as lubricant additive compositions, and more particularly, as additive compositions in industrial and gear lubricants. The compositions when added to lubricants provide lubricants which exhibit improved antioxidant characteristics, nitrile seal compatibility and acceptable color characteristics.

29 Claims, No Drawings

SULFURIZED COMPOSITIONS AND LUBRICANTS CONTAINING THEM

BACKGROUND OF THE INVENTION

This invention relates to new sulfurized compositions of matter which are suitable particularly for use as lubricant additives, and to methods for their preparation. More particularly, the sulfurized compositions of the invention are derived from a mixture of at least one terpene compound and at least one other olefinic compound.

Compositions prepared by the sulfurization of various materials including olefins are known in the art, and lubricants containing these compositions also are known. Typical sulfurized compositions prepared by reacting olefins such as isobutene, diisobutene and triisobutene with sulfur under various conditions are described in *Chemical Reviews*, 65, 237 (1965), and in *The Chemistry of Organic Sulfur Compounds*, Vol. II, Chapter 10, (1966). These products generally are characterized by the presence of a trithione grouping. A by-product is hydrogen sulfide, and it is frequently taught that it is desirable to remove the hydrogen sulfide which is formed. Other publications describe the reaction of such olefins as isobutene, diisobutene and triisobutene with hydrogen sulfide to form predominantly mercaptans, and by-products such as sulfides, disulfides and higher polysulfides. See, *J. Am. Chem. Soc.*, 60, 2452 (1938); *J. Chem. Soc.*, 1947, 1532; and U.S. Pat. Nos. 3,221,056 and 3,419,614.

U.S. Pat. No. 4,191,659 describes the preparation of sulfurized olefinic compounds by the catalytic reaction of sulfur and hydrogen sulfide with olefinic compounds containing from 3 to 30 carbon atoms. Such compounds are reported to being useful in lubricating compositions, particularly those prepared for use as industrial gear lubricants. U.S. Pat. No. 4,119,549 describes a similar procedure for sulfurizing olefins utilizing sulfur and hydrogen sulfide following by removal of low boiling materials from said sulfurized mixture.

Other sulfurized compositions of matter also have been suggested as compositions useful as additives for lubricants. U.S. Pat. No. 2,012,446 describes a method of sulfurizing pine oil which is reported as being useful as an additive for lubricant manufacture. U.S. Pat. No. 3,953,347 describes a sulfurized composition matter which is prepared by reacting sulfur with a mixture of at least one fatty acid ester of a polyhydric alcohol, at least one fatty acid and at least one aliphatic alpha-olefin. These latter compositions are suitable as replacement for sulfurized sperm oil as extreme pressure additives in lubricants.

SUMMARY OF THE INVENTION

A sulfurized composition prepared by sulfurizing a mixture of at least one terpene and at least one other olefinic compound is described. More particularly, sulfurized compositions prepared by sulfurizing a mixture of pine oil and at least one other olefinic compound are described. Such sulfurized compositions are useful as additive compositions in industrial and gear lubricants, and more particularly, as lubricant additive compositions. The compositions when added to lubricants provide lubricants which exhibit improved antioxidant characteristics, nitrile seal compatibility and acceptable color characteristics.

DESCRIPTION OF THE PREFERRED EMBODIMENTS

The sulfurized compositions of the present invention are prepared by the process which comprises sulfurizing a mixture comprising
 (A) at least one terpene compound, and
 (B) at least one other olefinic compound.

The term "terpene compound" as used in the specification and claims is intended to include the various isomeric terpene hydrocarbons having the empirical formula $C_{10}H_{16}$, such as contained in turpentine, pine oil and dipentenes, and the various synthetic and naturally occuring oxygen-containing derivatives. Mixtures of these various compounds generally will be utilized, especially when natural products such as pine oil and turpentine are used. Pine oil, for example, which is obtained by destructive distillation of waste pine wood with super-heated steam comprises a mixture of terpene derivatives such as alpha-terpineol, beta-terpineol, alpha-fenchol, camphor, borneol/isoborneol, fenchone, estragole, dihydro alpha-terpineol, anethole, and other mono-terpene hydrocarbons. The specific ratios and amounts of the various components in a given pine oil will depend upon the particular source and the degree of purification. A group of pine oil-derived products are available commercially from Hercules Incorporated. It has been found that the pine oil products generally known as terpene alcohols available from Hercules Incorporated are particularly useful in the preparation of the sulfurized products of the invention. Examples of such products include alpha-Terpineol containing about 95–97% of alpha-terpineol, a high purity tertiary terpene alcohol mixture typically containing 96.3% of tertiary alcohols; Terpineol 318 Prime which is a mixture of isomeric terpineols obtained by dehydration of terpene hydrate and contains about 60–65 weight percent of alpha-terpineol and 15–20% beta-terpineol, and 18–20% of other tertiary terpene alcohols. Other mixtures and grades of useful pine oil products also are available from Hercules under such designations as Yarmor 302, Herco pine oil, Yarmor 302W, Yarmor F and Yarmor 60.

The terpene compounds which can be utilized in the preparation of the sulfurized compositions of the present invention also may be sulfurized terpene compounds, sulfurized mixtures of terpene compounds or mixtures of at least one terpene compound and at least one sulfurized terpene compound. Sulfurized terpene compounds can be prepared by sulfurizing terpene compounds with sulfur, sulfur halides, or mixtures of sulfur or sulfur dioxide with hydrogen sulfide as will be described more fully hereinafter. Also, the sulfurization of various terpene compounds has been described in the prior art. For example, the sulfurization of pine oil is described in U.S. Pat. No. 2,012,446.

Component (B) which is included in the mixture to be sulfurized in accordance with the method of the invention is at least one other olefinic compound. The olefinic compounds contain at least one olefinic double bond which is defined as a non-aromatic double bond. That is, the double bond connects two aliphatic carbon atoms. In its broadest sense, the olefin utilized as component (B) may be defined by the formula

wherein each of $R^1$, $R^2$, $R^3$ and $R^4$ is hydrogen or an organic group. In general, the R values in the above formula which are not hydrogen may be satisfied by such groups as $-R^5$, $-C(R^5)_3$, $-COOR^5$, $-CON(R^5)_2$, $-COON(R^5)_4$, $-COOM$, $-CN$,

wherein: each $R^5$ is independently hydrogen, alkyl, alkenyl, aryl, alkylaryl, substituted alkyl or substituted alkenyl, with the proviso that any two $R^5$ groups can be alkylene or substituted alkylene whereby a ring of up to about 12 carbon atoms is formed;

M is one equivalent of a metal cation (preferably Group I or II, e.g., sodium, potassium, barium, calcium);

X is halogen (e.g., chloro, bromo, or iodo); and

Y is oxygen or divalent sulfur.

Any two of $R^1$, $R^2$, $R^3$ and $R^4$ may also together form an alkylene or substituted alkylene group; i.e., the olefinic compound may be alicyclic.

The nature of the substituents in the substituted moieties described above is not normally a critical aspect of the invention and any such substituent is useful so long as it is or can be made compatible with lubricating environments and does not interfere under the contemplated reaction conditions. Thus, substituted compounds which are so unstable as to deleteriously decompose under the reaction conditions employed are not contemplated. However, certain substituents such as keto or aldehydo can desirably undergo sulfurization. The selection of suitable substituents is within the skill of the art or may be established through routine testing. Typical of such substituents include any of the above-listed moieties as well as hydroxy, carboxy, carbalkoxy, amidine, amino, sulfonyl, sulfinyl, sulfonate, nitro, phosphate, phosphite, alkali metal mercapto and the like.

The olefinic compound is usually one in which each R group which is not hydrogen is independently alkyl or alkenyl, or (less often) a corresponding substituted group. Monoolefinic and diolefinic compounds, particularly the former, are preferred, and especially terminal monoolefinic hydrocarbons; that is, those compounds in which $R^3$ and $R^4$ are hydrogen and $R^1$ and $R^2$ are alkyl (that is, the olefin is aliphatic). Olefinic compounds having at least about 3 carbon atoms, and especially about 3 to about 36 carbon atoms are desirable. Olefins containing from about 8 to 24 carbon atoms are particularly useful.

The olefinic compound also can be an arylaliphatic compound, particularly wherein the aryl group is a phenyl or substituted phenyl group. Specific examples include styrene, alpha-methyl styrene, vinyl toluene, 4-ethyl vinyl benzene, etc.

Propylene, isobutene and their dimers, trimers, tetramers and oligomers, and mixtures thereof are especially preferred olefinic compounds. Examples of useful olefins include isobutene, 1-butene, 1-hexene, 1-octene, diisobutene, cyclohexene, triisobutene, commercially available higher aliphatic alpha-olefins, especially those in the $C_{12-30}$ range, such as 1-hexadecene and 1-octadecene, and commercial mixtures thereof such as $C_{15-20}$ alpha-olefins, $C_{16}$ alpha-olefins, $C_{15-18}$ alpha-olefins, $C_{22-28}$ alpha-olefins, etc.

Polymers of olefins such as, for example, isobutene also are useful so long as they and their sulfurized derivatives are compatible with the other components, and the sulfurized product does not lose its desirable properties. Polybutenes having number average molecular weights of up to about 1000 or 1500 are examples of useful polyolefins.

Generally, the olefinic component (B) is at least one aliphatic, aryl aliphatic, or alicyclic olefinic compound containing at least about 3 carbon atoms. Such olefinic compounds containing from about 3 to about 36 carbon atoms and more preferably from about 8 to about 24 carbon atoms are particularly useful. It is common to use mixtures of such olefins as component (B) since these mixtures are available commercially.

Component (B) also may be an unsaturated fatty acid, an unsaturated fatty acid ester, mixtures thereof, or mixtures thereof with the olefins described above. The term "fatty acid" as used herein refers to acids which may be obtained by hydrolysis of naturally occurring vegetable or animal fats or oils. These fatty acids usually contain from 16 to 20 carbon atoms and are mixtures of saturated and unsaturated fatty acids. The unsaturated fatty acids generally contained in the naturally occurring vegetable or animal fats and oils may contain one or more double bonds and such acids include palmitoleic acid, oleic acid, linoleic acid, linolenic acid, and erucic acid.

The unsaturated fatty acids useful as component (B) may comprise mixtures of acids such as those obtained from naturally occurring animal and vegetable oils such as lard oil, tall oil, peanut oil, soybean oil, cottonseed oil, sunflower seed oil, or wheat germ oil. Tall oil is a mixture of rosin acids, mainly abietic acid, and unsaturated fatty acids, mainly oleic and linoleic acids. Tall oil is a by-product of the sulfate process for the manufacture of wood pulp.

The most particularly preferred unsaturated fatty acid esters useful in this invention are the fatty oils, that is, naturally occurring esters of glycerol with the fatty acids described above, and synthetic esters of similar structure. Examples of naturally occurring fats and oils containing unsaturation include animal fats such as Neat's-foot oil, lard oil, depot fat, beef tallow, etc. Examples of naturally occurring vegetable oils useful as component (B) include cottonseed oil, corn oil, poppyseed oil, safflower oil, sesame oil, soybean oil, sunflower seed oil and wheat germ oil.

The fatty acid esters which are useful as component (B) in the invention also may be prepared from aliphatic olefinic acids of the type described above such as oleic acid, linoleic acid, linolenic acid, and behenic acid by reaction with alcohols and polyols. Examples of aliphatic alcohols which may be reacted with the above-identified acids include monohydric alcohols such as methanol, ethanol, n-propanol, isopropanol, the butanols, etc.; and polyhydric alcohols including ethylene glycol, propylene glycol, trimethylene glycol, neopentyl glycol, glycerol, etc.

The other olefinic compound utilized component (B) in the preparation of the compositions of the invention includes sulfurized derivatives of said olefinic compounds. Thus, component (B) may be any one or more of the above-identified olefinic compound, their sulfurized derivatives, or mixtures of said olefinic compounds and sulfurized derivatives. The sulfurized derivatives can be prepared by methods known in the art utilizing sulfurizing reagents such as sulfur, sulfur halides or mixtures of sulfur or sulfur dioxide with hydrogen sulfide.

The amounts of the terpene compounds (A) and other olefinic compounds (B) contained in the mixture to be sulfurized can vary over a wide range although it is essential that when the sulfurized compositions of the present invention are intended to be utilized as lubricant additives, a sufficient amount of the other olefinic compounds should be contained in the mixture to result in a sulfurized composition having the desired oil-solubility. It has been observed that sulfurized terpenes such as sulfurized pine oil generally do not exhibit the desired oil solubility characteristics, and it is essential that the mixture to be sulfurized contain enough of the other olefinic compound to result in the formation of a sulfurized composition having the desired oil-solubility. Generally, the equivalent ratio of component (A) to component (B) is from about 1:20 to about 10:1, and more generally will range from about 1:10 to about 5:1. More preferably, the equivalent ratio of component (A) to component (B) will be from about 1:10 to about 2:1. As mentioned above, the other olefinic compound, component (B) may be (i) at least one aliphatic, aryl aliphatic or alicyclic olefinic hydrocarbon containing at least 3 carbon atoms, (ii) at least one unsaturated fatty acid or unsaturated fatty acid ester, (iii) at least one sulfurized derivative of (i) or (ii), and (iv) mixtures thereof. The equivalent ratios of the various olefinic compounds when mixtures are utilized can be varied over a wide range, and the particular equivalent ratios will depend upon the raw materials available as well as the properties desired in the sulfurized composition.

It is frequently advantageous to incorporate materials useful as sulfurization promoters in the reaction mixture. These materials may be acidic, basic or neutral. Useful neutral and acidic materials include acidified clays such as "Super Filtrol", p-toluenesulfonic acid, phosphorus-containing reagents such as phosphorus acids (e.g., dialkyl-phosphorodithioic acids, phosphorus acid esters (e.g., triphenyl phosphate), phosphorus sulfides such as phosphorus pentasulfide and surface active agents such as lecithin.

The preferred promoters are basic materials. These may be inorganic oxides and salts such as sodium hydroxide, calcium oxide and sodium sulfide. The most desirable basic promoters, however, are nitrogen bases including ammonia and amines. The amines include primary, secondary and tertiary hydrocarbyl amines wherein the hydrocarbyl radicals are alkyl, aryl, aralkyl, alkaryl or the like and contain about 1 to 20 carbon atoms. Suitable amines include aniline, benzylamine, dibenzylamine, dodecylamine, naphthylamine, tallow amines, N-ethyldipropylamine, N-phenylbenzylamine, N,N-diethylbutylamine, m-toluidine and 2,3-xylidine. Also useful are heterocyclic amines such as pyrrolidine, N-methylpyrrolidine, piperidine, pyridine and quinoline.

The preferred basic promoters include ammonia and primary, secondary, or tertiary alkylamines having about 1 to 8 carbon atoms in the alkyl radicals. Representative amines of this type are methylamine, dimethylamine, trimethylamine, ethylamine, diethylamine, triethylamine, di-n-butylamine, tri-n-butylamine, tri-sec-hexylamine and tri-n-octylamine. Mixtures of these amines can be used as well as mixtures of ammonia and amines.

The amount of promoter material used is generally about 0.0005-2.0% of the combined weight of the terpene and olefinic compounds. In the case of the preferred ammonia and amine catalysts, about 0.0005-0.5 mole per mole of the combined weight is preferred, and about 0.001-0.1 mole is especially desirable.

Water is also present in the reaction mixture either as a promoter or as a diluent for one or more of the promoters recited hereinabove. The amount of water, when present, is usually about 1-25% by weight of the olefinic compound. The presence of water is, however, not essential and when certain types of reaction equipment are used it may be advantageous to conduct the reaction under substantially anhydrous conditions.

When promoters are incorporated into the reaction mixture as described hereinabove, it is generally observed when a promoter is used is that the reaction can be conducted at lower temperatures, and the product generally is lighter in color.

The sulfurizing reagent used in this invention may be, for example, sulfur, a sulfur halide such as sulfur monochloride or sulfur dichloride, a mixture of hydrogen sulfide and sulfur or sulfur dioxide, or the like. Sulfur, or mixtures of sulfur and hydrogen sulfide often are preferred. However, it will be understood that other sulfurization reagents may, when appropriate, be substituted therefor. Commercial sources of all the sulfurizing reagents are normally used for the purpose of this invention, and impurities normally associated with these commercial products may be present without adverse results.

When the sulfurization reaction is effected by the use of sulfur alone, the reaction is effected by merely heating the reagents with the sulfur at temperatures of from about 50° to 250° C., usually, from about 150° to about 210° C. The weight ratio of the combination of components (A) and (B) to sulfur is between about 5:1 and about 15:1, generally between about 5:1 and about 10:1. The sulfurization reaction is conducted with efficient agitation and generally in an inert atmosphere (e.g., nitrogen). If any of the components or reagents are appreciably volatile at the reaction temperature, the reaction vessel may be sealed and maintained under pressure. It is frequently advantageous to add the sulfur portionwise to the mixture of the other components.

When mixtures of sulfur and hydrogen sulfide are utilized in the process of the invention, the amounts of sulfur and hydrogen sulfide per mole of components (A) and (B) are, respectively, usually about 0.3 to about 3 gram-atoms and about 0.1 to about 1.5 moles. A preferred range is from about 0.5 to about 2.0 gram-atoms and about 0.4 to about 1.25 moles, respectively, and the most desirable ranges are about 0.8 to about 1.8 gram-atoms, and about 0.4 to about 0.8 mole, respectively. In batch operations, the components are introduced at levels to provide these ranges. In semi-continuous operations, they may be admixed at any ratio, but on a mass balance basis, they are present so as to be consumed in amounts within these ratios. Thus, for example, if the reaction vessel is initially charged with sulfur alone, the olefinic compound and hydrogen sulfide are added incrementally at a rate such that the desired ratio is obtained.

When mixtures of sulfur and hydrogen sulfide are utilized in the sulfurization reaction, the temperature range of the sulfurization reaction is generally from about 50° to about 350° C. The preferred range is about 100° to about 200° C. with about 120° to about 180° C. being especially suitable. The reaction often is conducted under super atmospheric pressure which may be and usually is autogenous pressure (i.e., pressure which naturally developed during the course of the reaction), but may also be externally applied pressure. The exact pressure developed during the reaction is dependent upon such factors as design and operation of the system, the reaction temperature, and the vapor pressure of the reactants and products, and it may vary during the course of the reaction.

As a preferred procedure the sulfurized composition is prepared by the process which comprises the steps of:
(A) preparing a mixture comprising sulfur and at least one terpene compound,
(B) heating said mixture to a temperature of up to about 150° C. and maintaining this temperature for a period of from about 2 to 20 hours,
(C) raising the temperature of the mixture to up to about 200° C. while removing water and volatile materials,
(D) adding at least one aliphatic olefinic compound to the mixture and maintaining the mixture at a temperature up to about 200° C. for a period of up to about 15 hours.

While it is preferred generally that the reaction mixture consists entirely of the components and reagents described above, the reaction also may be effected in the presence of an inert solvent (e.g., an alcohol, ether, ester, aliphatic hydrocarbon, halogenated aromatic hydrocarbon, etc.) which is liquid within the temperature range employed. When the reaction temperature is relatively high, for example, at about 200° C., there may be some evolution of sulfur from the product which is avoided is a lower reaction temperature such as from about 150°–170° C. is used.

The sulfurization of components (A) and (B) can be carried out sequentially in steps or all in one step simultaneously. The order of the sulfurization of components (A) and (B) is not critical to the invention. Accordingly, a mixture of components (A) and (B) can be prepared and then sulfurized. In another embodiment, the terpene component (A) is sulfurized in accordance with the process of the invention, and thereafter, the other olefinic compound is added to the mixture and the mixture is heated to an elevated temperature to effect the sulfurization of the olefin. In another embodiment, the olefinic compound (B) is first sulfurized, and the terpene compound (A) is then added and sulfurized with or without additional sulfur. In yet another embodiment, terpene compound (A) is sulfurized, and to the sulfurized terpene compound, there is added a separately prepared sulfurized olefinic compound (B), and this mixture is heated with or without adding additional sulfur to effect a further sulfurization of the mixture.

The time required for the sulfurization reaction to be completed will vary depending the upon the reagents, the ratios thereof, the reaction temperature, the presence or absence of promoters, and the purity of the reagents. When a mixture of sulfur and sulfur dioxide is used as the sulfurizing agent and the reaction is conducted at an elevated pressure in a closed vessel, the course of the reaction can conveniently be followed by monitoring the pressure in the reaction vessel. The reaction generally can be considered complete when the pressure levels off to a constant value. Following the preparation of the sulfurized mixture by the procedures described above, it is generally preferred to remove substantially all low boiling materials, typically by venting the reaction vessel or by distillation at atmospheric pressure, vacuum distillation or stripping, or the passage of an inert gas such as nitrogen through the mixture at a suitable temperature and pressure. Any solids which are present in the reaction mixture may be removed conveniently, in most instances, by merely pouring off the liquid product. If further removal of solids is desired, such conventional techniques as filtration or centrifugation may be used.

In some instances, it may be desirable to treat the sulfurized product obtained in accordance with the procedures described herein to reduce active sulfur. The term "active sulfur" includes sulfur in a form which can cause staining of copper and similar materials, and standard tests are available to determine sulfur activity. As an alternative to the treatment to reduce active sulfur, metal deactivators can be used and the lubricants containing sulfurized compositions of this invention. In some instances, such as in metal working lubricants, high levels of active sulfur may be desired, and in those situations, it may be preferred not to reduce active sulfur.

When active sulfur is to be reduced, several methods known in the art may be employed and an illustrative method utilizing an alkali metal sulfide is described in U.S. Pat. No. 3,498,915. Other optional treatments may be employed to remove such qualities such as the odor, color and staining characteristics of the sulfurized compositions of the invention. These may include treatment with acidic clays such as Super Filtrol, activated charcoal, aluminum clays, etc.

The exact chemical nature of the sulfurized compositions of this invention is not known with certainty, and it is most convenient to describe them in terms of their method of preparation. The sulfur content of the sulfurized compositions of the invention can vary over a wide range, although the sulfurized compositions of the present invention generally will contain up to about 35 to 40% sulfur, and more generally from about 15 to 30 or 35% by weight of sulfur.

The compositions of this invention generally will be derived from mixtures wherein components (A) and (B) are present in equivalent ratios of from about 1:20 to about 10:1, and more preferably, from about 1:10 to about 5:1 or 2:1.

The following examples illustrate the preparation of sulfurized terpene compounds and sulfurized olefinic compounds which are useful as components (A) and (B) respectively in the present invention. Unless otherwise indicated, all parts and percentages are by weight, and temperatures are in degrees centigrade.

EXAMPLE A

To a reaction vessel there is charged 372 parts (2 equivalents) of a commercially available pine oil (Sargent Welch), and the pine oil is heated and stirred. Sulfur (128 parts) is added slowly with nitrogen blowing while the reaction temperature is maintained at about 35° C. After addition of the sulfur is completed, nitrogen is bubbled through the reaction mixture while it is heated to reflux at about 145° C. After a total reaction time of about 8 hours, the mixture is filtered through filter aid. The filtrate is the desired sulfurized product containing 23.35% sulfur (theory 25.6).

EXAMPLE B

The procedure of Example A is repeated except that the reaction mixture comprises 186 parts of pine oil (1 equivalent) and 32 parts of sulfur (1.0 equivalent). The product obtained in this matter has a sulfur content of 15.6% (theory 14.68).

EXAMPLE C

To a reaction vessel there is added 372 parts (2 equivalents) of pine oil and 96 parts (3 equivalents) of sulfur. When all of the sulfur is added, the mixture is heated to 150° C. with nitrogen blowing, and the mixture is maintained at this temperature for about 10 hours. The reaction mixture is filtered through a filter aid, and the filtrate is the desired product having a sulfur content of 17.25% (theory 20.5).

EXAMPLE D

Pine oil (372 parts, 2 equivalents) is added to a reaction vessel, and the pine oil is heated with stirring. Sulfur (190 parts, 6 equivalents) is added slowly to the stirred pine oil, and after addition is completed, nitrogen is blown through the reaction mixture which is heated to a temperature of about 145° C. Triethanol amine (5.62 parts) is added, and heating of the mixture is continued with reflux until the sulfur appears to be dissolved. The mixture is filtered, and the filtrate is the desired product containing 25.4% sulfur (theory 33.80).

EXAMPLE E

Sulfur (526 parts, 16.4 moles) is charged to a jacketed high pressure reactor which is fitted with an agitator and internal cooling coils. Refrigerated brine is circulated through the coils to cool the reactor prior to the introduction of the gaseous reactants. After sealing the reactor, evacuating to about 2 torr and cooling, 920 parts (16.4 moles) of isobutene and 279 parts (8.2 moles) of hydrogen sulfide are charged to the reactor. The reactor is heated using steam in the external jacket, to a temperature of about 182° C. (360° F.) over about 1.5 hours. A maximum pressure of 1350 psig. is reached at about 168° C. (335° F.) during this heat-up. Prior to reaching the peak reaction temperature, the pressure starts to decrease and continues to decrease steadily as the gaseous reactants are consumed. After about 10 hours at a reaction temperature of about 182° C., the pressure is 310-340 psig. and the rate of pressure change is about 5-10 psig. per hour. The unreacted hydrogen sulfide and isobutene are vented to a recovery system. After the pressure in the reactor has decreased to atmospheric, the sulfurized mixture is recovered as a liquid.

The mixture is blown with nitrogen at about 100° C. (212° F.) to remove low boiling materials including unreacted isobutene, mercaptans and monosulfides. The residue after nitrogen blowing is agitated with 5% Super Filtrol and filtered, using a diatomaceous earth filter aid. The filtrate is the desired sulfurized composition which contains 42.5% sulfur.

EXAMPLE F

The procedure of Example E is repeated except that the isobutylene is replaced by a $C_{16}$-$C_{18}$ alpha-olefin, the molar ratio of olefin:sulfur:$H_2S$ is 1:1.5:0.5, and the reaction temperature is about 171° C. The product obtained from this example contains 20.6% sulfur.

EXAMPLE G

The procedure of Example E is repeated except that the isobutene is replaced by a polyisobutene having a number average molecular weight of about 1000 as determined by vapor pressure osmometry. The ratio of polyisobutene:sulfur:$H_2S$ is 1:0.5:0.5, and the reaction temperature is 171° C. The sulfurized product obtained in this manner contains about 2.6% sulfur.

The following examples illustrate the preparation of the sulfurized compositions of the present invention.

EXAMPLE H

A mixture of 60 parts of commercial $C_{15-20}$ alpha-olefins and 100 parts of lard oil is heated to 160° C. under nitrogen, and 12 parts of sulfur are added. The mixture is heated at 165°-200° C., and an additional 6.5 parts of sulfur are added. Heating is continued for four hours after which the mixture is cooled to 100° C. and filtered. The filtrate is the desired product which contains 9.0% sulfur.

EXAMPLE I

A mixture of 100 parts of soybean oil and 50 parts of commercial $C_{16}$ alpha-olefins is heated to 175° C. under nitrogen, and 17.4 parts of sulfur are added gradually whereupon an exothermic reaction causes the temperature to rise to 205° C. The temperature is maintained at about 188°-200° C. for about 5 hours, allowed to cool gradually to 90° C. and filtered to yield the desired product containing 10.13% sulfur.

EXAMPLE 1

A mixture of 111 parts (0.5 mole) of a distilled $C_{16}$ alpha-olefin and 93 parts (0.5 mole) of pine oil is prepared and heated with stirring in a reaction vessel. Sulfur (64 parts, 2 moles) is added slowly, and the reaction temperature is raised to about 170° C. The reaction mixture is maintained at a temperature of 160° C. with nitrogen blowing. Some refluxing of the light ends of the pine oil is observed. The reaction mixture is then cooled and filtered through a filter aid. The filtrate is the desired product containing 25.16% sulfur (theory 23.9).

EXAMPLES 2-5

The general procedure of Example 1 is repeated except that the equivalent ratio of olefin:pine oil:sulfur is varied, and in Example 5, a promoter system consisting of 0.043 equivalent of triethanol amine and 0.01 equivalent of 2,5-bis(tertoctyldithio) thiadiazole are used as promoter for each equivalent of pine oil and the mixture. Further details regarding these examples is found in the following Table I.

TABLE I

| Example | Olefin | Equivalent Ratio Olefin/Pine Oil/S | % S in Product Act/Theory |
|---|---|---|---|
| 2 | $C_{16}$ olefin | 1:1:3 | 19.07/19.09 |
| 3 | $C_{16}$ olefin | 1:1:5 | 27.44/28.17 |
| 4 | $C_{16}$ olefin | 1:1:6 | 28.82/32 |
| 5 | $C_{16}$ olefin | 1:1:5 | 24.57/27.77 |

EXAMPLE 6

A mixture of 186 parts (1 equivalent) of pine oil and 168 parts (1 equivalent) of polypropylene is prepared, and 96 parts (3 equivalents) of sulfur are added with stirring. The reaction mixture is heated to a temperature of about 170° C. with nitrogen blowing and maintained at this temperature for 10 hours. The reaction mixture then is cooled and filtered through filter aid. The filtrate is the desired product having a sulfur content of 16.79% (theory 21.33%).

EXAMPLE 7

The procedure of Example 6 is repeated except that the equivalent ratio of polypropylene:pine oil:sulfur is 1:1:4, and the reaction mixture is maintained at 170° C. for about 8 hours. The product obtained in this manner contains 27.30% sulfur (theory 26.55).

EXAMPLE 8

The mixture of 186 parts of pine oil (1 equivalent), 126 parts of nonene (1 equivalent) and 192 parts (6 equivalents) of sulfur is prepared and heated to reflux at about 135° C. for 2 hours. After cooling overnight, 10.1 parts of triethyl amine (0.1 equivalent) and 4.3 parts of 2,5-bis(tert-octyldithio) thiadiazole are added as promoter. The mixture is heated to 135°–140° C. with nitrogen blowing until the reaction mixture becomes clear. The mixture is heated an additional 6 hours at reflux and filtered through a filter aid. The filtrate is the desired product containing 33.49% sulfur (theory 37.1%).

EXAMPLE 9

Polypropylene (252 parts, 1.5 equivalents) is charged to a reaction vessel equipped with a condenser and stirrer. The polypropylene is stirred and 48 parts (1.5 equivalents) of sulfur are added. This reaction mixture is heated to about 170° C. and maintained at this temperature for about 5 hours and cooled. Pine oil (279 parts, 1.5 equivalents) is added to the reaction mixture which is then heated to a temperature of about 150° C. and maintained at this temperature with nitrogen blowing for about 8 hours. The mixture is cooled and filtered through a filter aid to yield the desired product having a sulfur content of 8.36% (theory 8.2%).

EXAMPLE 10

Polypropylene (336 parts, 2 equivalents) is charged to a reaction vessel equipped with condenser, thermometer and stirrer. The mixture is heated, and 128 parts (4 equivalents) of sulfur are added, and the temperature is slowly increased to about 170° C. with nitrogen blowing. The reaction mixture is maintained at a temperature of about 160°–170° C. for about 8 hours, and after cooling to a temperature of about 70° C., 372 parts (2 equivalents) of pine oil are added, and the mixture is reheated to about 130° C. After cooling the mixture to add a foam trap, it is reheated to a temperature of 140°–150° C. and maintained at this temperature for about 4 hours. The mixture is cooled to about 35° C. and filtered through a filter aid. The filtrate is the desired product having a sulfur content of about 15.1% (theory 15.31%).

EXAMPLE 11

A mixture of 93 parts (0.5 equivalent) of pine oil and 48 parts (1.5 equivalents) of sulfur is charged to a reaction vessel equipped with condenser, thermometer and stirrer. The mixture is heated to about 140° C. with nitrogen blowing and maintained at this temperature for about 28 hours. After cooling, 111 parts of a $C_{16}$ alpha-olefin (available from Gulf Oil Chemicals Company under the general trade name Gulftene 16) are added through an addition funnel, and after addition is complete, the addition funnel is replaced with a nitrogen tube. The reaction mixture is heated to 170° C. with nitrogen blowing and maintained at the temperature for about 5 hours. The mixture is cooled and filtered through a filter aid. The filtrate is the desired product having a sulfur content of 19.01% (theory 19.04%).

EXAMPLE 12

A mixture of 372 parts (2 equivalents) of pine oil and 544 parts (17 equivalents) of sulfur is prepared and heated to a temperature of about 140°–145° C. and maintained at this temperature for 8 hours. A $C_{16}$ alpha-olefin (444 parts, 2 equivalents) is added and this reaction mixture is heated to 180°–185° C. while removing water and light ends. The mixture is filtered, and the filtrate is the desired product containing 30.9% sulfur (theory 40%).

EXAMPLE 13

A mixture of 372 parts (2 equivalents) of pine oil and 397 parts (12.4 equivalents) of sulfur is prepared and heated with stirring and nitrogen blowing to a temperature of about 140°–145° C. The mixture is maintained at this temperature for about 8 hours whereupon 222 parts (1 equivalent) of a $C_{16}$ alpha-olefin are added. This mixture is heated to about 180° C. and maintained at this temperature for about 5 hours and is filtered after cooling to about 70° C. The filtrate is the desired product.

EXAMPLE 14

A mixture of 186 parts (1 equivalent) of pine oil and 420 parts (13.1 equivalents) of sulfur is prepared and heated to a temperature of about 140°–145° C. The mixture is maintained at this temperature for about 8 hours, and 444 parts (2 equivalents) of a $C_{16}$ alpha-olefin are added. This mixture is heated to 180°–185° C. with nitrogen blowing while removing a small amount of light ends and water. The mixture is filtered through filter aid to give the desired product having a sulfur content of 29.89%.

EXAMPLE 15

A mixture of 93 parts (0.5 equivalent) of pine oil and 90 parts (1.25 equivalents) of sulfur is prepared and heated to 140° C. with nitrogen blowing. The temperature is maintained at about 140° C. for about 20 hours whereupon 111 parts (0.5 equivalent) of a $C_{16}$ alpha-olefin are added dropwise over a period of about one hour. The temperature is increased to about 180° C. with nitrogen blowing, and the mixture is maintained at this temperature for about 12 hours. The reaction mixture is cooled and filtered to yield the desired product containing 15.4% of sulfur (theory 16.4%).

EXAMPLE 16

A mixture of 372 parts (2 equivalents) of steam distilled pine oil (Sergeant-Welch) and 119 parts (3.72 mole equivalents) of sulfur is prepared and heated with nitrogen blowing to a temperature of 140° C. for about 8 hours. After to 100° C., 444 parts (2 equivalents) of a $C_{16}$ alpha-olefin are added over a period of about one hour. The mixture then is heated to about 180° C. and maintained at this temperature for about 6 hours. After cooling to a temperature of about 100° C., the reaction mixture is filtered to yield the desired product containing 15.3% sulfur (theory 13.0%).

EXAMPLE 17

A mixture of 186 parts (1 equivalent) of steam distilled pine oil and 96 parts (3 equivalents) of sulfur is heated to reflux and maintained at this temperature with stirring and nitrogen blowing for about 4 hours. Lard oil (391 parts, 1 equivalent) is added and the mixture heated with stirring and nitrogen blowing for about 8 hours at 180° C. Twenty parts of water and 22 parts of light ends are removed during this period. The reaction mixture is filtered through filter aid to yield the desired product containing 12.45% sulfur (theory 14.3%).

EXAMPLE 18

A mixture of 186 parts (1 equivalent) of steam distilled pine oil and 96 parts (3 equivalents) of sulfur is heated to 140° C. with nitrogen blowing for a period of about 4 hours while removing 4 parts of water. Lard oil (391 parts, 1 equivalent) is added followed by the addition of 1.5 parts of phosphoric acid as a promoter. This mixture is heated to 180° C. and maintained at this temperature for about 8 hours while removing additional water and about 20 parts of light ends. The mixture is filtered through filter aid to yield the desired product containing 14.14% of sulfur (theory 15.07%).

EXAMPLE 19

A mixture of 186 parts (1 equivalent) of steam distilled pine oil, 96 parts (3 equivalents) of sulfur and 1.5 parts of phosphoric acid prepared and heated to a temperature of about 140° C. while stirring and with nitrogen blowing. The mixture then is heated up to about 200° C. while collecting about 15 parts of water whereupon the mixture is cooled to 140° C. and held at this temperature for about 4 hours. Lard oil (391 parts, 1 equivalent) is added and the mixture heated to 180° C. and maintained at this temperature for about 8 hours while blowing with nitrogen. The reaction mixture is filtered through a filter aid to yield the desired product having a sulfur content of 21.59% (theory 15.3%).

EXAMPLE 20

A mixture of 159 parts (1 equivalent) of pine oil and 545 parts (1 equivalent) of a polyisobutenyl substituted succinic anhydride is prepared and heated to a temperature of about 140° C. while removing some of the light ends of the pine oil. The mixture then is heated to and maintained at a temperature of about 180° C. for about 6 hours. After cooling, 5.2 parts (0.13 equivalent) of ethyleneamine polyamine are added to the reaction vessel and this mixture is heated to 180° C. and maintained at this temperature for about 12 hours. After cooling overnight, 24 parts (0.75 equivalent) of sulfur is added and the mixture is reheated to 180° C. The mixture is maintained at 180° C. for about 8 hours and thereafter filtered through filter aid. The filtrate is the desired product containing 2.63% sulfur (repeat 2.33%).

EXAMPLE 21

A mixture of 372 parts (2 equivalents) of Yarmor 60 pine oil available from Hercules Incorporated and containing about 62.7% of terpene alcohols, and 192 parts (6 equivalents) of sulfur is prepared in a reaction vessel equipped with a condenser, thermometer and stirrer. The mixture is heated with stirring and nitrogen blowing to a temperature of about 140° C. and maintained at this temperature for about 8 hours. Commercial $C_{16}$ alpha-olefin (444 parts, 2 equivalents) is added, and the temperature of the mixture is increased to 170° C. and maintained at this temperature for about 8 hours while removing 3 parts of water and 27 parts of light ends. The reaction mixture is cooled to about 100° C. and filtered through a filter aid. The filtrate is the desired product containing 18.7% sulfur (theory 19.07%).

EXAMPLE 22

The procedure of Example 21 is repeated except that the pine oil utilized in this example is Yarmor F pine oil available from Hercules Incorporated and containing a total of about 75% of terpene alcohol. The product obtained in this manner has a sulfur content of 18.4% (theory 19.07%).

EXAMPLE 23

A mixture of 744 parts (4 equivalents) of steam distilled pine oil and 384 parts (12 equivalents) of sulfur (8 mesh) is prepared and heated to a temperature of about 140°-145° C. and maintained at this temperature for about 8 hours. A water trap is then added to the reaction flask whereupon water and light ends are removed. Commercial $C_{1618}$ alpha-olefin (888 parts, 4 equivalents) is added dropwise over a period of about 45 minutes while maintained at a reaction temperature at about 180° C. for about 5 hours. The reaction mixture is cooled and filtered. The filtrate is the desired product containing 17.61% sulfur (theory 20.0%).

EXAMPLE 24

A mixture of 100 parts of the product of Example A and about 125 parts of the product of Example E is prepared and heated to a temperature of about 200°-225° C. for 10 hours to yield the desired product upon filtration.

EXAMPLE 25

The procedure of Example 24 is repeated except that 32 parts of sulfur are added to the mixture before the mixture is heated to a temperature of about 200°-225° C.

EXAMPLE 26

The procedure of Example 24 is repeated except that the product of Example E is replaced by an equivalent amount of the product of Example H.

EXAMPLE 27

The procedure of Example 26 is repeated except that 32 parts of sulfur is included in the mixture.

The sulfurized compositions of this invention are useful as additives for lubricants in which they function primarily as oxidation inhibitors and extreme pressure and anti-wear agents. Lubricating oils containing the sulfurized compositions of the invention exhibit good compatibility with synthetic elastomers such as those used as sealants in automotive transmissions. Transmission fluid, for example, can affect the tensile strength, elongation, hardness and volume of synthetic rubbers. Compounds such as Buna-N, polyacrylates and silicones are used in transmission oil seals. Lubricating compositions and automatic transmission fluids containing the sulfurized compositions of the invention exhibit good nitrile seal compatibility. The sulfurized products of the invention which include at least one terpene compound exhibit improved oil-solubility when compared to sulfurized terpenes, and the presence of the terpene compound in the sulfurized mixture generally results in the production of sulfurized products characterized by having a lighter color than can be obtained from the sulfurization of olefins when terpenes are not present.

The sulfurized compositions of the invention can be effectively employed in a variety of lubricating compositions formulated for a variety of uses. These lubricating compositions are based on diverse oils of lubricating viscosity, including natural and synthetic lubricating oils and mixtures thereof. These lubricating compositions containing the subject additive concentrates are effective as crankcase lubricating oils for spark-ignited and compression-ignited internal combustion engines, including automobile and truck engines, two-cycle engines, aviation piston engines, marine and low-load diesel engines, and the like. Also, automatic transmission fluids, transaxle lubricants, gear lubricants, metal-working lubricants, hydraulic fluids, and other lubricating oil and grease compositions can benefit from the incorporation of the subject additive concentrates.

Natural oils include animal oils and vegetable oils (e.g., castor oil, lard oil) as well as mineral lubricating oils such as liquid petroleum oils and solvent-treated or acid-treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins (e.g., polybutylenes, polypropylenes, propyleneisobutylene copolymers, chlorinated polybutylenes, etc.); poly(1-hexenes), poly(1-octenes), poly(1-decenes), etc. and mixtures thereof; alkylbenzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of about 1000, diphenyl ether of polyethylene glycol having a molecular weight of about 500–1000, diethyl ether of polypropylene glycol having a molecular weight of about 1000–1500, etc.) or mono- and polycarboxylic esters thereof, for example, the acetic acid esters, mixed $C_3$–$C_8$ fatty acid esters, or the $C_{13}$Oxo acid diester of tetraethylene glycol.

Another suitable class of synthetic lubricating oils that can be used comprises the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.) Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also inlcude those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-hexyl)silicate, tetra-(p-tert-butylphenyl)silicate, hexyl-(4-methyl-2-pentoxy)disiloxane, poly(methyl)siloxanes, poly(methylphenyl)siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

Unrefined, refined and rerefined oils, either natural or synthetic (as well as mixtures of two or more of any of these) of the type disclosed hereinabove can be used in the concentrates of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

Generally the lubricants of the present invention contain an amount of one or more of the sulfurized compositions of this invention sufficient to provide them with improved antioxidant, anti-wear and/or extreme pressure properties. Normally the amount employed will be about 0.01% to about 20%, preferably about 0.1% to about 10% of the total weight of the lubricating composition. This amount is exclusive of solvent/diluent medium. In lubricating compositions operated under extremely adverse conditions, such as lubricating compositions for marine diesel engines, the compositions of this invention may be present in amounts of up to about 30% by weight, or more, of the total weight of the lubricating composition.

The invention also contemplates the use of other additives in combination with the sulfurized compositions of this invention. Such additives include, for example, detergents and dispersants of the ash-producing or ashless type, corrosion- and oxidation-inhibiting agents, pour point depressing agents, extreme pressure agents, antiwear agents, color stabilizers and anti-foam agents.

The ash-producing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature of about 50° C. and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, cellosolve, carbitol, ethylene glycol, stearyl alcohol, and cyclohexyl alcohol; and amines such as aniline; phenylenediamine, phenothiazine; phenyl-beta-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°–200° C.

Ashless detergents and dispersants are so called despite the fact that, depending on its constitution, the dispersant may upon combustion yield a non-volatile material such as boric oxide or phosphorus pentoxide; however, it does not ordinarily contain metal and therefore does not yield a metal-containing ash on combustion. Many types are known in the art, and any of them are suitable for use in the lubricant compositions of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Pat. No. 1,306,529 and in many U.S. patents including the following:

| | | |
|---|---|---|
| 3,163,603 | 3,351,552 | 3,541,012 |
| 3,184,474 | 3,381,022 | 3,543,678 |
| 3,215,707 | 3,399,141 | 3,542,680 |
| 3,219,666 | 3,415,750 | 3,567,637 |
| 3,271,310 | 3,433,744 | 3,574,101 |
| 3,272,746 | 3,444,170 | 3,576,743 |
| 3,281,357 | 3,448,048 | 3,630,904 |
| 3,306,908 | 3,448,049 | 3,632,510 |
| 3,311,558 | 3,451,933 | 3,632,511 |
| 3,316,177 | 3,454,607 | 3,697,428 |
| 3,340,281 | 3,467,668 | 3,725,441 |
| 3,341,542 | 3,501,405 | 4,234,435 |
| 3,346,493 | 3,522,179 | Re 26,433 |

(2) Reaction products of relatively high molecular weight aliphatic or alicyclic halides with amines, preferably olyalkylene polyamines. These may be characterized as "amine dispersants" and examples thereof are described for example, in the following U.S. patents:

| | |
|---|---|
| 3,275,554 | 3,454,555 |
| 3,438,757 | 3,565,804 |

(3) Reaction products of alkyl phenols in which the alkyl group contains at least about 30 carbon atoms with aldehydes (especially formaldehyde) and amines (especially polyalkylene polyamines), which may be characterized as "Mannich dispersants". The materials described in the following U.S. patents are illustrative:

| | | |
|---|---|---|
| 2,459,112 | 3,442,808 | 3,591,598 |
| 2,962,442 | 3,448,047 | 3,600,372 |
| 2,984,550 | 3,454,497 | 3,634,515 |
| 3,036,003 | 3,459,661 | 3,649,229 |
| 3,166,516 | 3,461,172 | 3,697,574 |
| 3,236,770 | 3,493,520 | 3,725,277 |
| 3,355,270 | 3,539,633 | 3,725,480 |
| 3,368,972 | 3,558,743 | 3,726,882 |
| 3,413,347 | 3,586,629 | 3,980,569 |

(4) Products obtained by post-treating the carboxylic, amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. patents:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,422 |

(5) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in the following U.S. patents:

| | |
|---|---|
| 3,329,658 | 3,666,730 |
| 3,449,250 | 3,687,849 |
| 3,519,565 | 3,702,300 |

The above-noted patents are incorporated by reference herein for their disclosures of ashless dispersants.

Auxiliary extreme pressure agents and corrosion- and oxidation-inhibiting agents which may be included in the lubricants of the invention are exemplified by chlorinated aliphatic hydrocarbons such as chlorinated wax; organic sulfides and polysulfides such as benzyl disulfide, bis(chlorobenzyl)disulfide, dibutyl tetrasulfide, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate, phosphorus esters including principally dihydrocarbon and trihydrocarbon phosphites such as dibutyl phosphite, diheptyl phosphite, dicyclohexyl phosphite, pentylphenyl phosphite, dipentylphenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(heptylphenyl)phosphorodithioate, cadmium dinonylphosphorodithioate, and the zinc salt of a phosphorodithioic acid produced by the reaction of phosphorus pentasulfide with an equimolar mixture of isopropyl alcohol and n-hexyl alcohol.

Many of the above-mentioned auxiliary extreme pressure agents and corrosion-oxidation inhibitors also serve as antiwear agents. Zinc dialkylphosphorodithioates are a well known example.

Pour point depressants are a particularly useful type of additive often included in the lubricating oils described herein. The use of such pour point depressants in oil-based compositions to improve low temperature properties of oil-based compositions is well known in the art. See, for example, page 8 of "Lubricant Additives" by C. V. Smalheer and R. Kennedy Smith (Lezius-Hiles Co. publishers, Cleveland, Ohio, 1967).

Examples of useful pour point depressants are polymethacrylates; polyacrylates; polyacrylamides; condensation products of haloparaffin waxes and aromatic compounds; vinyl carboxylate polymers; and terpolymers of dialkylfumarates, vinyl esters of fatty acids and alkyl vinyl ethers. Pour point depressants useful for the purposes of this invention, techniques for their preparation and their uses are described in U.S. Pat. Nos. 2,387,501; 2,015,748; 2,655,479; 1,815,022; 2,191,498; 2,666,746; 2,721,877; 2,721,878; and 3,250,715 which are hereby incorporated by reference for their relevant disclosures.

Anti-foam agents are used to reduce or prevent the formation of stable foam. Typical anti-foam agents include silicones or organic polymers. Additional anti-foam compositions are described in "Foam Control Agents", by Henty T. Kerner (Noyes Data Corporation, 1976), pages 125–162.

The sulfurized compositions of this invention can be added directly to the lubricant. Preferably, however, they are diluted with a substantially inert, normally liquid organic diluent such as mineral oil, naphtha, benzene, toluene or xylene, to form an additive concentrate. These concentrates usually contain from about 20% to about 90% by weight of the sulfurized compositions of this invention and may contain, in addition, one or more other additives known in the art or described hereinabove. The remainder of the concentrate is the substantially inert normally liquid diluent.

The following examples illustrate the lubricant compositions of the invention (including additive concentrates).

TABLE II

| Example | Lubricants (Parts by Weight) | | | | |
|---|---|---|---|---|---|
| | L-1 | L-2 | L-3 | L-4 | L-5 |
| Mineral Oil | 98.58 | 98.75 | 98.57 | 98.14 | 98.64 |
| Product of | | | | | |
| Example 1 | 0.87 | | | | |
| Example 3 | | 1.0 | | | |
| Example 9 | | | 0.94 | | |
| Example 11 | | | | 1.25 | |
| Example 21 | | | | | 0.87 |

TABLE II-continued

| Example | Lubricants (Parts by Weight) | | | | |
|---|---|---|---|---|---|
| | L-1 | L-2 | L-3 | L-4 | L-5 |
| Mixture of mono- and di-para alkylated diphenyl amines | | 0.25 | | | |
| Amine neutralized hydroxyalkyl dialkyl phosphorodithioate | 0.40 | | 0.40 | 0.50 | 0.40 |
| Polyoxyalkylene demulsifier | 0.005 | | 0.005 | 0.005 | 0.005 |
| N—tridecyltrimethylene diamine | 0.05 | | 0.05 | 0.05 | 0.05 |
| Tolyltriazole | 0.015 | | 0.015 | 0.015 | 0.015 |
| Silicone antifoam agent | 0.02 | | 0.02 | 0.04 | 0.02 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A sulfurized composition prepared by the process which comprises sulfurizing a mixture comprising
   (A) at least one terpene compound, and
   (B) at least one other olefinic compound of the formula:

$$R^1R^2C = CR^3R^4$$

wherein $R^1$, $R^2$, $R^3$ and $R^4$ are, independently, hydrogen or an organic group and the olefinic double bond is a non-aromatic double bond; wherein (A) and (B) are sulfurized in the presence of sulfur, sulfur halide, or a mixture of sulfur or sulfur dioxide and hydrogen sulfide; and wherein the equivalent ratio of the mixture of (A) to (B) is from about 1:20 to about 10:1.

2. The composition of claim 1 wherein (A) comprises at least one sulfurized terpene compound or a mixture of at least one terpene compound and at least one sulfurized terpene compound.

3. The composition of claim 1 wherein the terpene compound (A) comprises a mixture of terpene hydrocarbons and their oxygen-containing derivatives.

4. The composition of claim 1 wherein the terpene compound is a turpentine, pine oil, or dipentene.

5. The composition of claim 3 wherein the oxygen-containing derivatives are terpene alcohols.

6. The composition of claim 4 wherein the terpene compound is a pine oil.

7. The composition of claim 1 wherein the other olefinic compound (B) is
   (i) at least one aliphatic, aryl aliphatic or alicyclic olefinic hydrocarbon containing at least about 3 carbon atoms,
   (ii) at least one unsaturated fatty acid or unsaturated fatty acid ester,
   (iii) at least one sulfurized derivative of (i) or (ii), or
   (iv) mixtures thereof.

8. The composition of claim 7 wherein the olefin (B) is at least one aliphatic olefinic compound.

9. The composition of claim 8 wherein the olefinic compound is at least one of propylene, isobutene, and dimers, trimers, tetramers and low molecular weight polymers thereof.

10. The composition of claim 1 wherein the other olefinic compound (B) is at least one aliphatic olefin containing from about 3 to about 36 carbon atoms.

11. The composition of claim 8 wherein the aliphatic olefin is at least one alpha-olefin.

12. The composition of claim 11 wherein the alpha-olefin contains from about 3 to about 36 carbon atoms.

13. The composition of claim 1 wherein the olefinic compound (B) comprises a mixture of at least one alpha-olefin and at least one unsaturated fatty acid or unsaturated fatty acid ester.

14. The composition of claim 1 wherein the mixture is sulfurized by reaction with sulfur.

15. The composition of claim 1 wherein the ratio of (A) to (B) is from about 1:10 to 2:1.

16. The composition of claim 1 wherein (A) is a sulfurized terpene and sulfurization is effected by heating the mixture.

17. The composition of claim 1 wherein (B) is a sulfurized olefinic compound and sulfurization is effected by heating the mixture.

18. The composition of claim 1 wherein (A) is at least one sulfurized terpene, (B) is at least one other olefinic compound which is sulfurized, and sulfurization is effected by heating the mixture.

19. The composition of claim 1 wherein the olefin (B) is at least one unsaturated fatty acid, unsaturated fatty acid ester, or mixtures thereof.

20. The composition of claim 1 wherein the mixture also contains a sulfurization promoter.

21. A sulfurized composition prepared by the process which comprises the steps of (A) preparing a mixture comprising sulfur and at least one terpene compound,
(B) heating said mixture to a temperature of up to about 150° C. and maintaining this temperature for a period of from about 2 to 20 hours,
(C) raising the temperature of the mixture to up to about 200° C. while removing water and volatile materials,
(D) adding at least one aliphatic olefinic compound to the mixture and maintaining the mixture at a temperature up to about 200° C. for a period of up to about 15 hours.

22. The composition of claim 21 wherein about one equivalent of olefin is added per equivalent of terpene compound.

23. The composition of claim 21 wherein the terpene compound is a pine oil.

24. The composition of claim 21 wherein the olefin compound is an alpha-olefin.

25. The composition of claim 21 wherein the olefin compound contains from about 3 to about 36 carbon atoms.

26. An additive concentrate comprising a substantially inert, normally liquid diluent and about 20-90% by weight of the sulfurized composition of claim 1.

27. An additive concentrate comprising a substantially inert, normally liquid diluent and about 20-90% by weight of the sulfurized composition of claim 21.

28. A lubricating composition comprising a major proportion of lubricating oil and a minor proportion, sufficient to improve the oxidation inhibiting properties, of a sulfurized composition according to claim 1.

29. A lubricating composition comprising a major proportion of lubricating oil and a minor proportion, sufficient to improve the oxidation inhibiting properties, of a sulfurized composition according to claim 21.

* * * * *